United States Patent [19]
Dowling

[11] Patent Number: 5,517,585
[45] Date of Patent: May 14, 1996

[54] SYSTEM AND METHOD FOR STABLE ANALYSIS OF SAMPLED TRANSIENTS ARBITRARILY ALIGNED WITH THEIR SAMPLE POINTS

[75] Inventor: Martin J. Dowling, Norristown, Pa.

[73] Assignee: Liberty Technologies, Inc., Conshohocken, Pa.

[21] Appl. No.: 58,113

[22] Filed: May 5, 1993

[51] Int. Cl.$^6$ .................................................. G06K 9/00
[52] U.S. Cl. ....................... 382/291; 382/280; 364/715.01
[58] Field of Search ................................. 382/41, 44, 45, 382/42, 43, 278–280, 276, 282, 291; 371/6; 364/715.01, 725, 726, 728.01, 728.03

[56] References Cited

U.S. PATENT DOCUMENTS

| | | | |
|---|---|---|---|
| 5,048,102 | 9/1991 | Tararine et al. | 382/41 |
| 5,101,441 | 3/1992 | Yamaguchi | 382/41 |
| 5,272,723 | 12/1993 | Kimoto et al. | 364/724.19 |

OTHER PUBLICATIONS

I. "Orthonormal bases of wavelets with finitie support–connection with discrete filters," Wavelets: Time–Frequency Methods and Phase Space. I. Daubechies, p. 38067, 1989.
"Dyadic wavelets energy zero crossings," Grasp Lab. 56 pages, Jul., 1988 S. G. Mallat.
"Multifrequency channel decompositions of images and wavelet models," IEEE Trans. ASSP, vol. 37, No. 12, pp. 2091–2110, Dec. 1989.
Discrete–Time Signal Processing, A. V. Oppenheim, pp. 676–687, 1989.
Modern Electrical Communications: Theory and Systems, H. Start and F. B. Tuteur, pp. 66–73, 1979.

*Primary Examiner*—Joseph Mancuso
*Assistant Examiner*—Larry J. Prikockis
*Attorney, Agent, or Firm*—Panitch Schwarze Jacobs & Nadal

[57] ABSTRACT

A method of stably identifying and characterizing a transient contained in a sampled set of data, the data representing a physical event, where alignment of the sample points with the transient is typically arbitrary. The method includes the step of analyzing the first data set using a predefined mathematical operator to produce a second data set, detecting and isolating the discrete data pattern in the second data set, determining a location of the detected and isolated data pattern in the second data set, measuring a difference between the location of the detected and isolated data pattern and a predetermined location of the predefined mathematical operator, adjusting preselected parameters of the mathematical operator in accordance with the measured location difference such that the adjusted mathematical operator is aligned with the detected and isolated data pattern, and reanalyzing the first data set using the aligned mathematical operator.

28 Claims, 7 Drawing Sheets

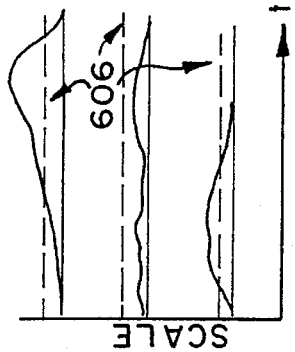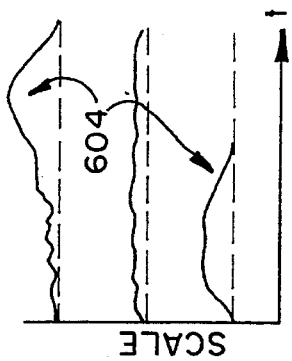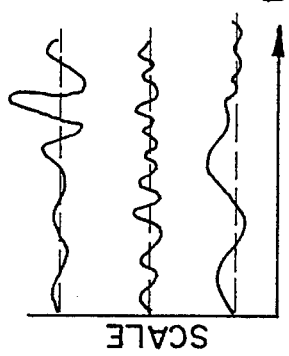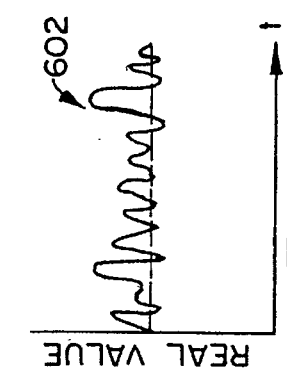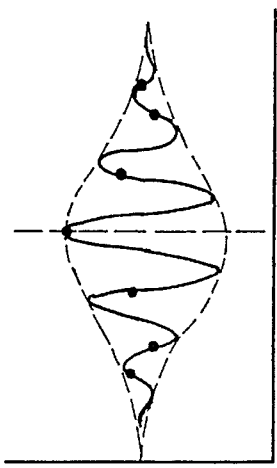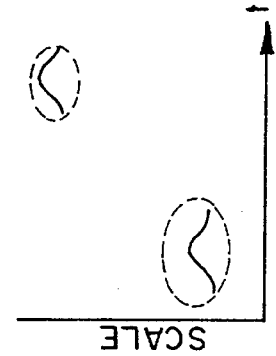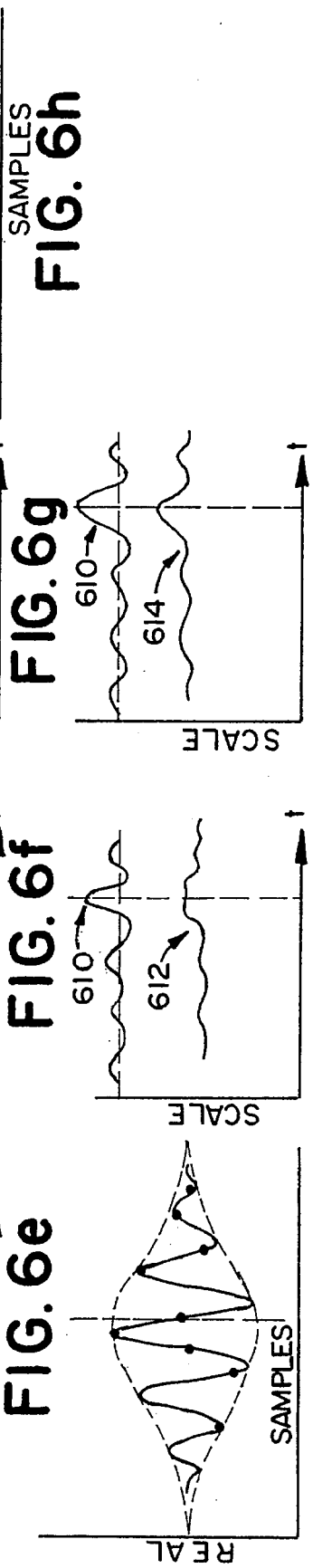

SYSTEM AND METHOD FOR STABLE ANALYSIS OF SAMPLED TRANSIENTS ARBITRARILY ALIGNED WITH THEIR SAMPLE POINTS

This invention was made with government support under Grant No. ISI-9160156 awarded by the National Science Foundation. The government has certain rights in this invention.

BACKGROUND OF THE INVENTION

The present invention generally relates to a system and method for stably identifying and characterizing isolated data patterns, or transients in a signal, representing some physical entity and more specifically to situations where the transients may be arbitrarily aligned with the sample points arising from an analog to digital (A/D) process applied to the signal.

In general, when a sampled digital signal from an A/D process is operated on by a signal processing function such as correlation, convolution, or transform, an arbitrary shift in the input signal with respect to the sample points causes changes in the output of the signal processing function, as well. This effect is aggravated when the sampling rate is reduced close to the critical sampling rate. FIG. 1 illustrates an arbitrary shift in the sampling of a signal. For many digital signal processes, such shifts produce a significant change in the output of the signal processing function. For example, the discrete Fourier transform computes inner products of time data and a complex exponential. If a signal is sampled and then resampled at the same rate but in such a manner that the second set of samples does not line up with the first, then the real, imaginary, and phase spectra will be different.

This variation in the end result arising from an arbitrary shift in the sample points on the signal is referred to herein as shift variance. In the case of the Discrete Fourier Transform, shift variance is not generally a problem because the commonly used magnitude spectrum is not shift variant.

For certain processes, shift variance can be aggravated where sampling is sparse on certain scales. An example is the affine discrete (especially critically sampled) wavelet transform. FIG. 2 shows a transient (FIG. 2a) and its wavelet decomposition (FIGS. 2b, 2c and 2d) before and after a shift (FIGS. 2e, 2f, 2g, 2h). The decomposition is totally different because of a shift of just one sample.

Thus, though the continuous form of the wavelet transform is shift invariant, the discrete form is not. FIG. 2 illustrates that the discrete wavelet transform is sensitive to the exact positioning of the transient in a sampled time record. Note that dramatically different coefficients results depending on where the transient happens to occur in the sampled time record. For physical signals, the location of the transient in the sampled time record is usually unknown and completely arbitrary. Thus, for physical signals the discrete wavelet transform (used in digital signal processing) is unreliable in its ability to detect, characterize and classify transients. This is unfortunate because as a continuous transform (unrealizeable in practice), the wavelet is unsurpassed in its ability to identify and characterize transients.

The shift variance problem for processes such as the discrete wavelet transform will now be discussed in more detail. For some processes, a shift of an integer number of samples of the input signal produces the same, albeit shifted, output which is usually acceptable. However, whenever the shift is a non-integer number of samples, the coefficients generally will be different (i.e., not simply shifted). The shift variance problem is aggravated in multiscale analysis such as the discrete wavelet transform because even an integer sample shift on the most resolute scale is a non-integer shift on less resolute scales.

Conventional attempts to overcome the shift variance problem are generally inadequate and typically rely on either oversampling, or resampling the data pattern based on zero crossings or maxima locations. Such conventional approaches are discussed in greater detail in the following paragraphs. There also exist specialized transforms designed to be immune to particular types of shifts, but these transforms are flawed due to their lack of generality and thus shall not be discussed further.

Oversampling reduces the sampling interval so that the extent of arbitrary shifting is confined. For example, if the original sampling rate were 1 KHz, the worst case subsample positional shift would be 0.5 msec in the time record. If the sampling rate were increased to 10 KHz, the worse case would be 0.05 msec. However, such improvement is achieved at the expense of the need to process a much greater amount of data. Note that the oversampling approach makes no attempt to solve the underlying problem. Rather, the oversampling approach simply bounds the error. Oversampling can be implemented in hardware by increasing the rate of the analog-to-digital converter, or in software by interpolation (such as upsampling with zeroes followed by low pass filtering). In either case, the cost to achieve oversampling is significant. In summary, oversampling is flawed because it does not optimally solve the shift variance problem, it greatly increases the burden of computation and it is expensive.

The flaws associated with oversampling are aggravated for methods, such as the discrete wavelet transform, which analyze signals on multiple scales. Wavelets are defined as the sets of functions:

$$g_{ab}(x) = |a|^{-1/2} g\left(\frac{x-b}{a}\right) \quad (1)$$

The sets are formed by dilations, a, and translations, b, of a function g(x), called the analyzing wavelet. The set of functions maintains the shape of the analyzing wavelet throughout the time-frequency or time-scale plane.

The discrete wavelet transform of a signal s(x) can be represented by:

$$S(kT, a) = \frac{T}{\sqrt{a}} \sum_n s(nT) g^*\left(\frac{(n-k)T}{a}\right) \quad (2)$$

which is essentially an inner product of the discrete form of the conjugate of the wavelet, g(.), with the discrete form of the signal, s(.), where T is the sampling interval ($T=1/f_s$). By varying the dilation, a, the transform provides decomposition at many scales. By analogy to map-making, "scale" is the level of detail provided at dilation a. Various conditions are usually imposed on wavelets, namely, the analyzing wavelet must have finite energy, and the integral of the wavelet must vanish.

Two currently employed approaches proposed specifically for solving the shift variance problem of the discrete wavelet transform will now be described. The first approach estimates the positions of the zero crossings in the record, then resamples the data in software in order to stabilize the samples. While this approach is an improvement over prior art, it experiences the following difficulties: (a) forming the resampled representation and reconstruction is very mathematically intensive; (b) it cannot be used with scale-envelopes because envelopes do not have zero-crossings; (c) it is designed for shift-correcting global patterns and thus is of questionable applicability for isolated transients and other isolated patterns; (d) it does not always produce a unique representation and reconstruction.

The second approach is a variation of the first method. Instead of using zero-crossings, the second approach uses signal maxima as the basis for resampling. The second approach is an improvement upon the first approach, but is still mathematically intensive, of questionable applicability for isolated patterns, and does not guarantee uniqueness.

SUMMARY OF THE INVENTION

Briefly stated, the present invention is directed to a method of stably identifying and characterizing a transient contained in a sampled set of physical data, where alignment of the sample points with the transient is typically arbitrary. The method uses a novel means for reducing the shift variance problem that is superior to the two means cited above. The method comprises the steps of sensing the physical entity, sampling the sensed signal resulting in a first data set, analyzing the first data set using a predefined mathematical operator to produce a second data set and detecting and isolating the transient in the second data set. Next a location of the detected and isolated transient in the second data set is determined from a measure of its center or centroid. Then the misalignment between the center of the transient and the center of the predetermined mathematical operator at the best alignment position based on the sample points is measured. After the misalignment is measured, preselected parameters of the mathematical operator are adjusted in accordance with the measured misalignment such that the adjusted mathematical operator will now properly align with the detected and isolated sampled transient. Then, the first data set is reanalyzed using the aligned mathematical operator.

BRIEF DESCRIPTION OF THE DRAWINGS

For the purpose of illustrating the invention, there is shown in the drawings embodiments which are presently preferred. It should be understood, however, that the invention is not limited to the precise methods, arrangements, and instrumentalities shown. In the drawings:

(FIG. 2a shows the original signal before the shift. Its 3-scale wavelet transform is shown below in FIGS. 2b–2d. The signal after a one sample shift is shown in FIG. 2e, and the new changed decomposition in FIGS. 2f–2h.);

FIGS. 6a–6k depict signals for illustrating the operation of the present invention;

DETAILED DESCRIPTION OF THE PREFERRED EMBODIMENTS

The present invention is directed to methods of stably identifying and characterizing a transient contained in a sampled set of physical data where alignment of the sample points with the transient is typically arbitrary. In the following discussion, reference is made to the signal processing of one-dimensional signals. However, it should be understood that the present invention is applicable to other types of processing, such as image processing, and to signals of any number of dimensions.

Figure 1:
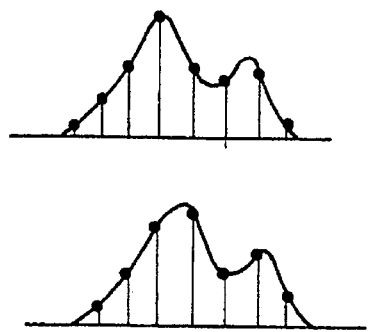
FIG. 1 shows two consecutive sample set of a signal, the second sample set being shifted from the first sample set.
Figure 2A:
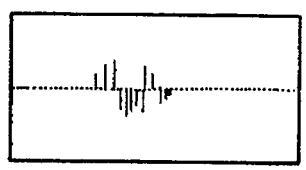
FIGS. 2a–2h show a transient and its wavelet decomposition before and after a shift.
Figure 2E:
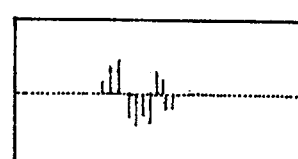
Figure 2B:
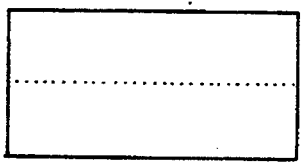
Figure 2F:
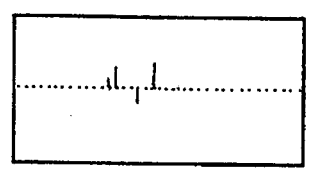
Figure 2C:
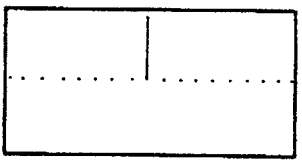
Figure 2G:
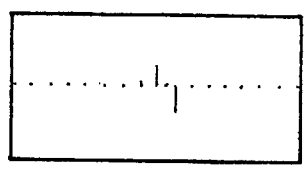
Figure 2D:
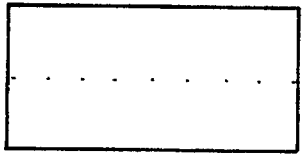
Figure 2H:
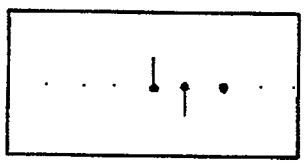
Figure 3:
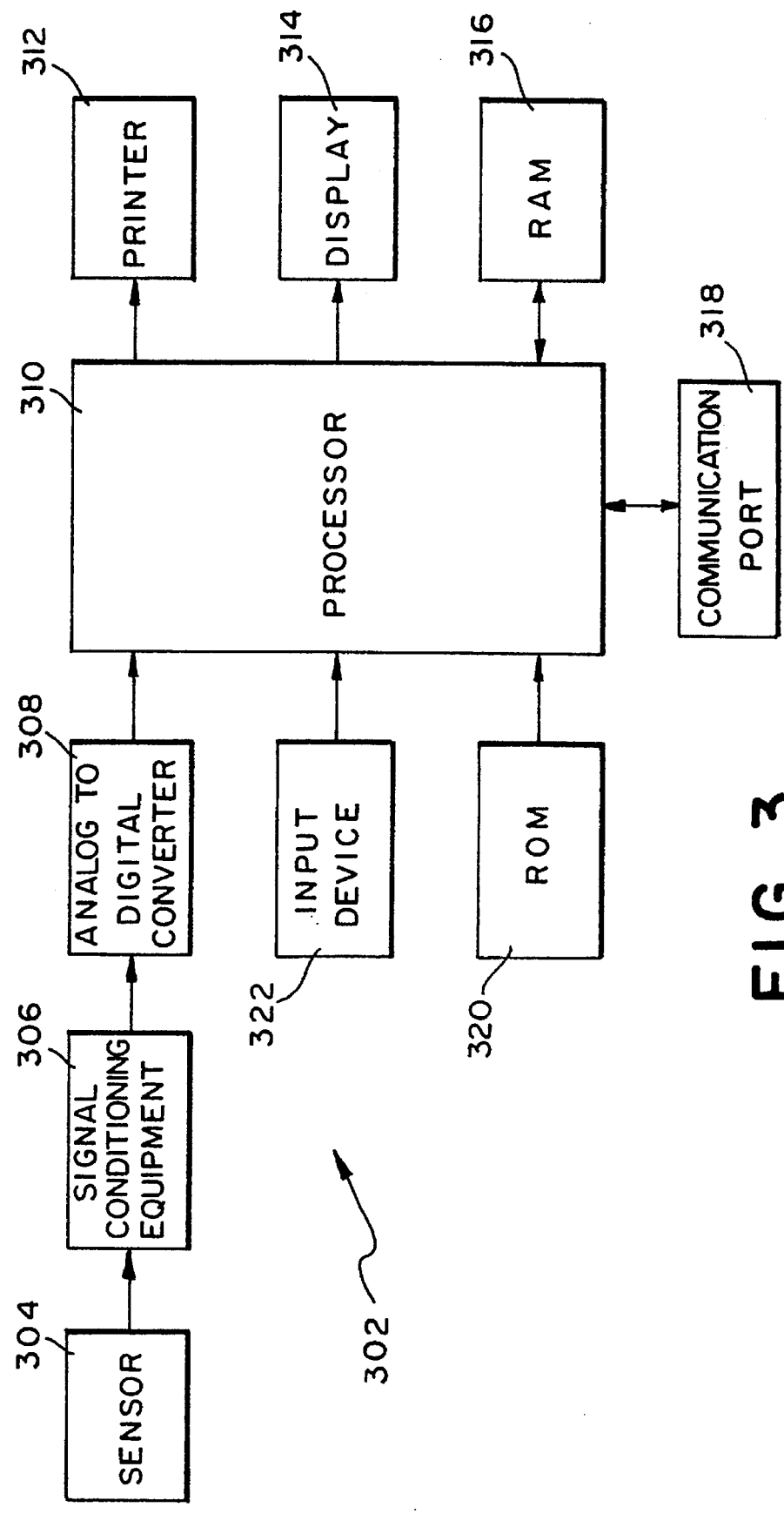
FIG. 3 is a block diagram of a preferred computer-based system which operates in accordance with the methods of the present invention.

Referring now to the drawings, in which like numerals indicate like elements throughout, there is shown in FIG. 3 a block diagram of a preferred computer-based system 302 which operates in accordance with the methods of the present invention. The system 302 includes a sensor 304, such as an accelerometer, pressure transducer, microphone, etc. The sensor 304 receives and converts a dynamic physical phenomena (not shown) into an analogous standard instrumentation signal (not shown) using a medium such as electricity, fluid, or light. The signal may represent, for example, an image or element thereof which is being analyzed. More generally, the signal may represent any localized or discrete data pattern.

The system 302 also includes signal conditioning equipment 306, which amplifies, impedance matches, filters, and otherwise improves the signal received from the sensor 304. The system 302 further includes an analog-to-digital (A/D) converter 308, which digitizes the analog signal received from the signal conditioning equipment 306.

A processor 310 receives and analyzes the digital signal from the A/D converter 308 in accordance with the methods of the present invention. The steps of the methods of the present invention are preferably embodied in computer software (not shown) which resides in a random access memory (RAM) 316, or ROM (320), described below. As will be appreciated, the processor 310 operates in accordance with the computer software. Alternatively, the methods of the present invention may be implemented using other means, such as hard wired logic circuits used in combination with or instead of the processor 310 and software (not shown).

The system 302 also includes a keyboard, mouse, or other input device 322, a read only memory (ROM) 320 (for storing fixed information), a communication port 318 (for receiving from another location or sending to another location, signals for analysis by the processor 310), a display 314 and a printer 312. Note that the RAM 316 may store signals for analysis by the processor 310. The structure and operation of the components in the system 302 (other than the computer software which implements the methods of the present invention) are generally well known. Such components of the system 302 may be implemented using any number of well-known, readily available computer-related products.

Figure 4:
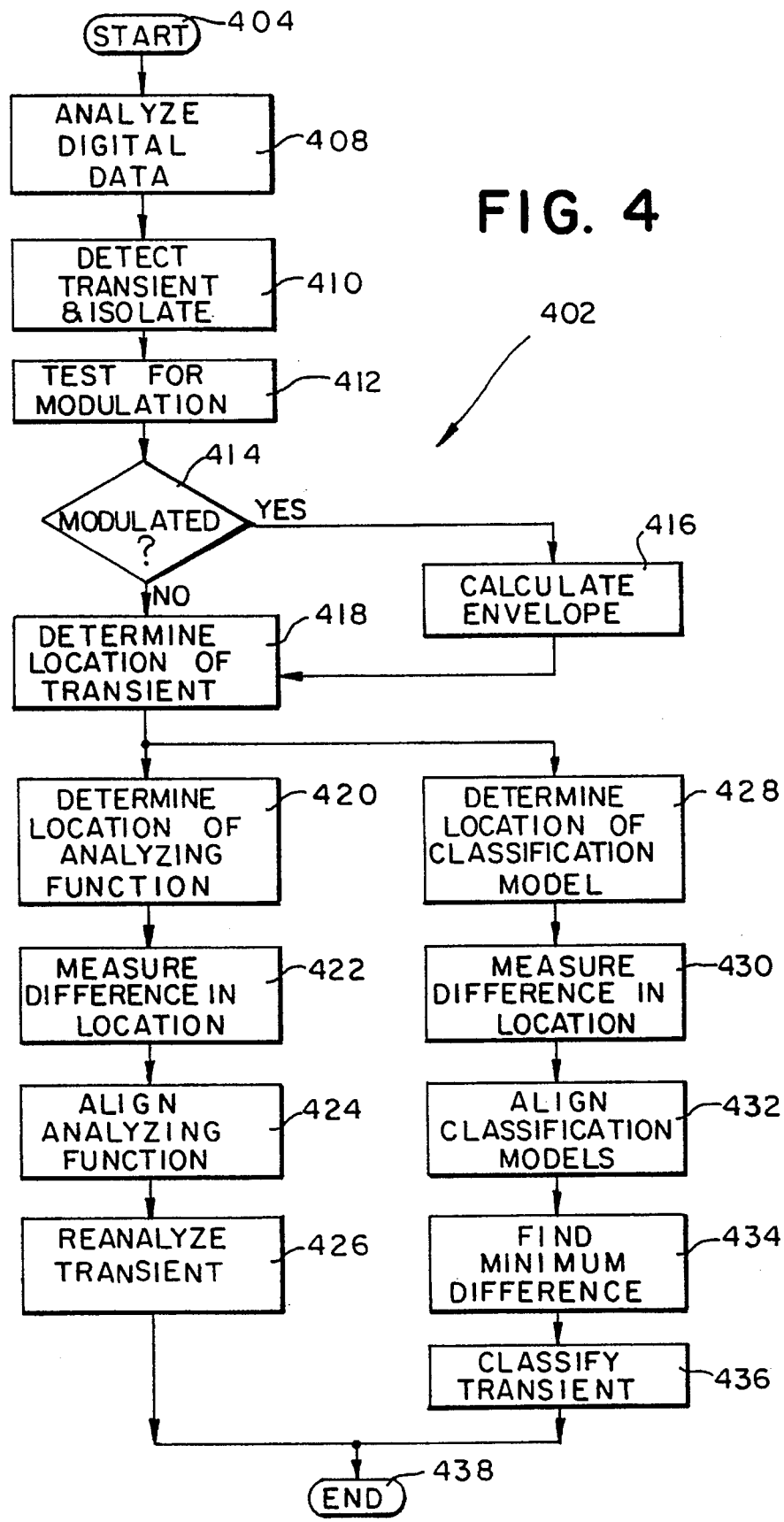
FIG. 4 is a flow chart for analyzing arbitrarily shifted data patterns in accordance with a first embodiment of the present invention.

FIG. 4 is a flow chart in accordance with a first embodiment of the present invention, showing a method of stably identifying and characterizing a transient contained in a first data set, representing physical data, where alignment of the sample data points with the transient may be arbitrary.

In step 408, the processor 310 analyzes the first data set using a predefined mathematical operator to produce a second data set. More particularly, in step 408 the processor 310 analyzes the digital signal (also called herein the raw signal, or first data set) received from the A/D converter 308 (or retrieved from RAM 316, or received from another location via the communication port 318). Such analysis may include the use of an analysis function such as a convolution or correlation, for example. The convolution operation is:

$$c(k) = \sum_n s(n)h(k-n) \quad (3)$$

where s(.) is the sequence of signal samples, h(.) is the filter impulse response, and c(.) is the output of the convolution.

In step 410, the processor 310 detects and isolates the discrete data pattern (associated with the transient) in the second data set (that is, the output of the analysis function). More particularly, in step 410 the processor 310 detects unmodulated transients in the analysis function output (also called herein the analyzed signal, or second data set). Modulated transients are also preferably detected in step 410 but they can alternatively be detected after amplitude demodulation (step 416). Any conventional detection technique can be used such as comparing the absolute or squared value of every sample against a threshold. Such detection can be enhanced by requiring that several adjacent samples must exceed the threshold before being counted. Another improvement includes ignoring occasional dropouts below the threshold. The detection process in step 410 may be further enhanced by passing demodulated transients through a non-linear filter that triggers only when a high energy level exists within a certain time restriction (i.e., trigger when a<Δt<b, where a and b are predefined time durations based on some general knowledge of the characteristics of the transients). Note that the upper limit may be long enough to include the possibility that two close transients may superficially appear to be one long signal. In the case of multiscale analysis, such as resulting from application of the affine wavelet transform, detection of an event can be confirmed by looking for simultaneous threshold exceedances on neighboring scales.

After a transient is detected, the detected transient is isolated in step 410 by estimating the boundary of the detected transient. The transient boundary is estimated based on, for example, the region of significant energy above background level.

In steps 412 and 414, the processor 310 tests the analyzed signal to determine if the analyzed signal is modulated, i.e., has the form of a modulated carrier. An auto-regression moving average (ARMA) or fast fourier transform (FFT) approach can be used, for example, to detect modulation. The modulation test can alternatively be done on the raw (unanalyzed) signal, but it is preferably performed after analysis (i.e., after step 408) for better reliability. It should be understood that the sequence of detection (step 410) and testing for modulation (steps 412 and 414) is not critical and should be tailored to the particular application.

If in steps 412 and 414 the transient is found to be essentially a time-limited amplitude-modulated carrier, then better results will often be obtained by calculating the position of the transient (step 418) after first demodulating the analyzed signal. Hence, for modulated transients, the processor 310 in step 416 envelope detects the second data set. That is, the processor 310 calculates the envelope of the transient detected in the analyzed signal. Preferably, amplitude demodulation is performed by creating an analytic signal on each scale. The envelope is then calculated as the magnitude of the analytic signal on each scale. Amplitude demodulation is preferably accomplished by well-known time domain techniques such as using the Hilbert transform, or by using well-known frequency domain techniques which typically include the steps of calculating the FFT of the analyzed signal, zeroing negative components and doubling positive components, and then taking the inverse FFT. While the analytic signal approach to demodulation has been identified as the preferred technique, other amplitude demodulation techniques may also be used in step 416.

In step 418, the processor 310 determines a location of the detected and isolated data pattern in the second data set. That is, the processor 310 determines a location of each transient detected in step 410. The determination (or measurement) conducted in step 418 must be such that small changes in the shape of the analyzed signal should result in small changes in the coefficients, and small errors in the measurement (step 418) should result in small changes in the resulting coefficients. Many techniques satisfying the above criteria exist for measuring the locations of detected transients, including:

a. Start of transient as transient location.

b. Center of transient (as measured by a generic statistic such as the centroid) as transient location;

c. The centroid approach (b) enhanced by weighting regions of low energy with low weights;

d. Minimum distance (such as the well-known Cramer-von Mises technique) fitted to a density function such as normal or the well-known Weibull function (the location of the transient then being taken as that of the density function);

e. Minimum distance approach (d) used with specific classification models. In this case, classification and location estimation would be accomplished at the same time.

Either the weighted centroid (c) or the minimum distance approach with specific class models (e) is preferred.

In step 420, the processor 310 determines the location of the analyzing function. The location of the analyzing function is generally known in advance and is preferably the location parameter used to generate the analyzing function. For example, if a gaussian enveloped sinusoid is the analyzing function, then the center of the envelope is preferably used as the location.

In step 422, the processor 310 measures a difference between the location of the detected and isolated data pattern and the location of the analyzing function. That is, the processor 310 measures the distance between the location of each transient (determined in step 418) and the location of the analyzing function (determined in step 420). If the analyzing function has several allowed locations (the usual case), then the nearest location is preferred as the reference. An example of a distance measure is the Euclidean.

In step 424, the processor 310 adjusts preselected parameters of the mathematical operator in accordance with the measured location difference such that the adjusted mathematical operator is aligned with the detected and isolated transient data pattern. That is, in step 424 the processor 310 shifts the analyzing function by the distance that was determined in step 422 to bring the location of the analyzing function into alignment with the location of the transient. Since the analyzing function is a mathematical function, step 424 is easily done by adjusting the location parameter of the analyzing function in accordance with the location difference measured in step 422. For example, if the analyzing function is a gaussian modulated cosine, the gaussian envelope as well as the cosine are both shifted by the same amount.

In step 426 the processor 310 reanalyzes the first data set using the aligned mathematical operator. That is, the processor 310 reanalyzes the raw signal using the shifted analysis function. Note that the entire raw signal is not reanalyzed, only those portions containing transients. For signals containing multiple transients, the analysis function is shifted and applied independently for each transient. As a result of step 426, a set of shift invariant analysis coefficients for each transient is produced.

In the special case where two transients overlap in time but have different frequency (scale) content, the same section of the signal is reanalyzed twice. The analyzing function is shifted to bring it into alignment with the first transient, and then the analyzing function is shifted again but by a different amount to bring it into alignment with the second transient. The above assumes that the transients have been sufficiently isolated and that their centroids or other measures of location have been individually determined.

As is well known, classification models are often used to classify and characterize transients or other data patterns. If classification models are used to classify transients in the present invention, then steps 428–436 are performed. In step 428, the processor 310 determines the nominal location of each classification model. The measure used in step 428 for determining the locations of the classification models should be the same as used in step 418 to determine the locations of the transients.

In step 430, the processor 310 measures the difference between the location (determined in step 418) of the transient which is being classified (called herein the transient of interest) and the location of each classification model (determined in step 428).

In step 432, the processor 310 brings each classification model into alignment with the transient. If the classification model is analytic, such alignment is performed by adjusting the location parameter of the classification model to compensate for the difference measured in step 430. For empirical classification models, such alignment is performed by interpolating the classification model, and then synthetically resampling to bring the classification model into alignment with the transient.

In step 434, the processor 310 measures the difference between each aligned model and the transient of interest. In step 436, the processor 310 identifies the classification model having the smallest difference with the transient of interest and classifies the transient of interest using the identified classification model. Well-known goodness of fit measures or procedures, for example, may be used in step 436. Note that steps 430–436 must be performed for each transient.

As shown in FIG. 4, classification of the transient occurs in parallel to aligning of the analyzing function and reanalysis of the transient. Alternatively, classification may occur after the transient has been reanalyzed to thereby bypass (i.e., eliminate) steps 428 through 434. According to this alternate embodiment, after the data is reanalyzed in step 426, classification (step 436) is directly accomplished on the reanalyzed transient. For particular applications in which the alignment of step 424 cannot be determined with great accuracy, the full classification procedure of FIG. 4, including steps 428–436, are used to provide the best results. However, it is expected that the procedure of the alternate embodiment (described in this paragraph) will typically be both accurate and faster.

The alternate embodiment just described may be enhanced by iterating the procedure of FIG. 4. Specifically, steps 410 and 414–426 are iteratively performed (after a first pass through steps 408–426) until the location difference determined in step 422 is less than a predetermined amount. If the location difference of step 422 is greater than the predetermined amount, then another iteration is performed starting with step 424 and proceeding through steps 426, 410, and 414–422. If the location difference is less than the predetermined amount, then step 436 is performed as described above to classify the transient based on the reanalyzed transient (thereby eliminating steps 428–434). Note that after the first pass is performed, step 414 can be bypassed since it will be known whether the signal is modulated. Also, after the first pass is performed, detection in step 410 can be bypassed since it will be known that the transient exists (although it will still be necessary to perform the isolating procedure of step 410). Further, note that it is expected that in many, if not most, situations, a single pass through the steps of FIG. 4 will be sufficient. However, the iterative procedure just described offers the dual benefits of: (1) increased accuracy, and (2) measurement of convergence.

The alternate embodiments described above with regard to FIG. 4 could be applied to the procedure of FIG. 5, which will now be described.

Figure 5:
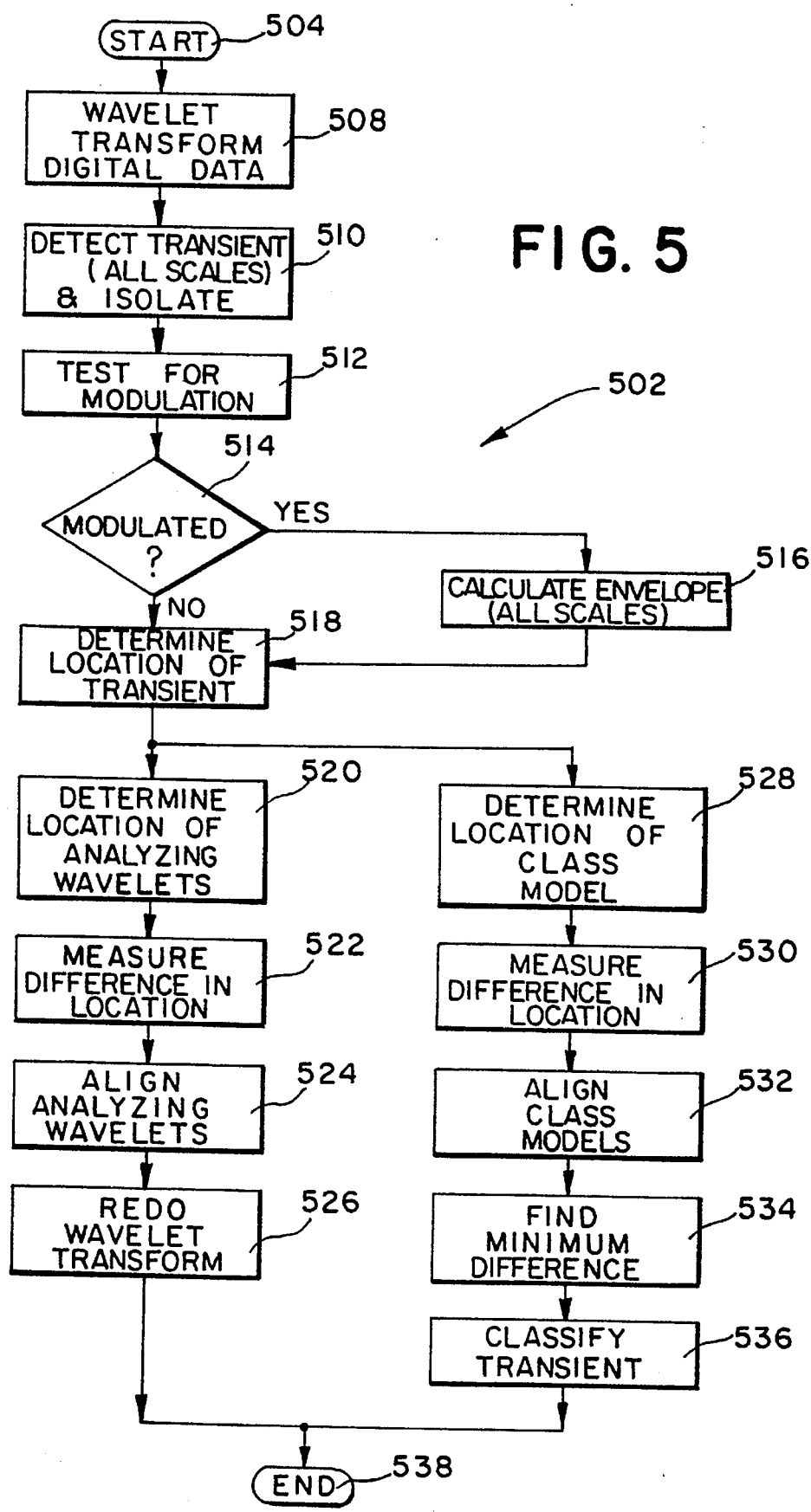
FIG. 5 is a flow chart for analyzing arbitrarily shifted data patterns in accordance with a second embodiment of the present invention.

FIG. 5 is a flow chart in accordance with a second embodiment of the present invention of a more specific method of stably identifying and characterizing a transient contained in a first data set, representing physical data, where alignment of the sample data points with the transient may be arbitrary. The flow chart of FIG. 5 is generally similar to the flow chart of FIG. 4. In particular, step 508 of the second embodiment is generally the same as step 408 of the first embodiment, except that in step 508 the processor 310 analyzes the signal (or first data set) using a discrete wavelet transform.

Step 510 of the second embodiment is generally the same as step 410 of the first embodiment, except that in step 510 the processor 310 must process multiple scales.

Step 512 of the second embodiment is generally the same as step 412 of the first embodiment, except that in step 512, the information needed to determine whether the analyzed signal is modulated may be available directly from the wavelet decomposition. For example, if the energy is much higher on a scale (except for the lowest frequency scale used) relative to its neighboring scales, then a modulated signal is present.

Steps 514 and 516 of the second embodiment are generally the same as steps 414 and 416 of the first embodiment.

Step 518 of the second embodiment, for measuring the transient location (and model location), is generally the same as step 418 of the first embodiment, except that in step 518 two-dimensional measures may be used to accommodate the fact that the energy is distributed over two dimensions (time and scale). For example, the bivariate centroid can be calculated using the following formula:

$$E(t) = \frac{\Sigma \Sigma S(t,a) \, t \, S^*(t,a)}{\Sigma \Sigma S(t,a) \, S^*(t,a)} \quad (4)$$

and for real variables:

$$E(t) = \frac{\Sigma \Sigma t \, S^2(t,a)}{\Sigma \Sigma S^2(t,a)} \quad (5)$$

where t is time, a is the scale, S(.,.) is the wavelet transform value, E( ) is the expected value, and the denominator takes care of normalization. For real, positive variables, such as amplitudes, unsquared values are often used. In the second embodiment, the time location estimate can be enhanced by using only those scales in which the signal predominates. The estimated scale location can be useful for classification.

Steps 520 and 522 in the second embodiment are generally the same as steps 420 and 422 in the first embodiment, except that in steps 520 and 522 the processor 310 must process multiple scales.

Step 524 in the second embodiment is generally the same as step 424 in the first embodiment, except that in step 524 the analyzing wavelet must be shifted on each scale by the same time increment (not necessarily by the same number of samples since the sampling interval changes on different scales in some decompositions). Also, the whole wavelet is shifted as a rigid unit: the real, imaginary, and envelope. This applies also in those cases for which an explicit wavelet is not used, such as multiresolution analysis. In multiresolution, low and high pass quadrature mirror filters are utilized in a coordinated fashion to accomplish the same end effect as if bandpass filters (analyzing wavelets) had been used, such that the high and low pass filter impulse responses are convolved with the signal. To be equivalent to a shift in the wavelet, the impulse response must be shifted with respect to the samples.

Step 526 of the second embodiment is generally the same as step 426 of the first embodiment.

Steps 528–536 of the second embodiment are generally the same as steps 428–436 of the first embodiment; however, if classification models (also called prototypes) are developed in the time domain, then they must be decomposed by means of the wavelet transform. Prototypes can also be developed in the time-scale plane if sufficient knowledge is available about their time-scale plane characteristics. If the prototypes are developed in the time-scale plane, then further decomposition is not necessary.

Also, for each prototype, the processor 310 must decide whether to use or not use the envelopes of the scale data. If envelopes are used for the transients (calculated in step 516), then envelopes must also be used for the prototypes. Thus, depending on the nature of the signal, the prototype is characterized by either a regular wavelet decomposition or a decomposition that has been demodulated on each scale.

Additionally, step 534 must take into account multiple scales. Step 534 preferably operates as follows. The difference in value between corresponding samples of each prototype is squared, multiplied by the sampling interval, and then summed over all samples. This is done on each scale for each prototype, and the results summed over all scales. Finally, the square root is taken of the grand total. The operation just described represents the numerator (less the factor 100) in equation (6) below. Low pass residue may also be used in the distance measure (step 530), although it is not shown in equation (6).

The percentage difference is calculated (in step 534) as the distance (or difference) divided by the sum of the norms of the two functions, times 100, as shown in equation (6):

0% and 100%, inclusive. The low pass residue may also be used to calculate the norms, and should be used if the distance measure utilizes it.

The exact order of detection (i.e., step 510) and modulation (i.e., steps 512, 514, and 516) is not crucial, nor are the exact measures used for location (steps 518, 520, and 528) or difference in location (i.e., steps 522 and 530). The optimal approach may vary with particular applications. The above mathematical formulas are presented herein for illustrative purposes only and are not limiting.

The present invention, and in particular the second embodiment of the present invention, shall now be described in greater detail with reference to the waveforms presented in FIGS. 6a–6k.

FIG. 6a illustrates a signal 602 which is to be analyzed by the system 302 in accordance with the second embodiment of the present invention (i.e., FIG. 5). The signal 602 of FIG. 6a contains considerable noise and two barely visible transients.

FIG. 6b illustrates a wavelet transform decomposition of the signal 602 after the processor 310 has performed step 508 (as described above). For simplicity purposes, only three scales are shown. Note in FIG. 6b that the signal to noise ratio has increased due to the decomposition because, in the example of FIG. 6b, the noise is divided among all three scales, each signal resides on only one scale.

As noted above, the order of steps 510, 512, 514, and 516 is not important. In this example, the processor 310 performs steps 512, 514, and 516 before performing step 510. The result of performing steps 512, 514, and 516 is shown in FIG. 6c where the envelopes are indicated by 604.

The processor 310 then performs step 510 to detect the transients in the demodulated signal, as shown in FIG. 6d. Step 510 is performed by comparing the envelopes 604 with thresholds 606. In the simplest implementation, transients are defined as the regions where the envelopes 604 exceed the thresholds 606. Conditions can be associated with this, such that the envelopes 604 must exceed the thresholds 606 for a certain minimum number of samples (in order to avoid irrelevant spikes, for example), or for less than a certain maximum number of samples (in order to discriminate transients from trends, for example). There are many well-known, appropriate detection methods which may be applied.

For illustrative purposes, FIG. 6e depicts the transients themselves (in this case, meaning that part of the envelopes 604, on each scale, that is above the thresholds 606).

Also in step 510, the processor 310 isolates the transients, as depicted in FIG. 6f. Isolation of the transients is relatively simple if the transients are well separated. Overlapping transients on the same scale can be recognized if their combined length is too long for any kind of transient of interest. If such overlapping transients are discovered, they are separated by, for example, splitting them at their minimum point, or by treating them as mixed distributions and $$\% \text{ diff} = \frac{100 \sum_j \left( (\Delta t)_j \sum_{n=N_2}^{N_2} |Wf(n\Delta t)_j - Wg(n\Delta t)_j|^2 \right)^{1/2}}{\left( \sum_j (\Delta t)_j \sum_{n=N_1}^{N_2} |Wf(n\Delta t)_j|^2 \right)^{1/2} + \left( \sum_j (\Delta t)_j \sum_{n=N_1}^{N_2} |Wg(n\Delta t)_j|^2 \right)^{1/2}} \quad (6)$$

$Wf_j$ and $Wg_j$ are the wavelet transforms of functions f and g on scale j, and $n\Delta t$ is the discretized time. By using equation (6), the percent difference always remains between using such well-known techniques as expectation maximization.

FIG. 6g depicts the locations 608 of the transients as determined by the processor in step 518. The locations are calculated over multiple scales if the transients cover multiple scales. Preferably, the bivariate centroid is used.

For illustrative purposes, FIG. 6h depicts the real part of the analyzing wavelet, wherein the envelope and the sinusoid peak occur on the same sample. Note that the analyzing wavelet is generated from a mathematical expression and thus can be centered at any location with respect to the sampling. FIG. 6h generally represents the operation of step 520.

FIG. 6i depicts the shifted and aligned analyzing wavelet after operation of steps 522 and 524. In the example of FIG. 6i, the analyzing wavelet has been shifted by the amount that the analyzing wavelet centroid (determined in step 520) is different from the nearest sample in order to bring the center of the analyzing wavelet into exact alignment with the center of the transient.

In step 526, the processor 310 reanalyzes the original signal 602 using the shifted analyzing wavelets. An upper transient 610 of the reanalyzed signal is shown in FIG. 6j.

With regard to steps 528–536, FIG. 6j shows the upper transient 610 being compared to a prototype 612 of the wrong class. FIG. 6k shows the upper transient 610 being compared to a prototype 614 of the correct class.

The present invention may be embodied in many forms, for example, as a system to detect rubbing in a journal bearing supporting a steam turbine shaft. The system includes one or more accelerometers mounted on a bearing cap. The contact that occurs during a rub is momentary, and is in the nature of an impulse. The rubbing impact being very brief in time, creates a broad spectrum and excites the natural frequencies in the bearing housing. The system of the present invention detects and analyzes these natural frequency transients. Note that in the earliest stages the rub occurs only occasionally and has low energy content.

The system of the present invention further distinguishes the rubbing from the following transients: a) electrical transients that occasionally disturb the electrical circuit; b) transients caused by sudden changes in generator load; c) transients caused by sudden motion of injection and extraction valves in the turbine. The latter effects produce a weak reaction at the bearing, but may be in the same order of magnitude as rubbing in incipient stages. In order to automatically distinguish these transients, classification models may be developed in the time-frequency or time-scale plane. In the latter case either an analytic or empirical example of each type of transient is developed or captured and this is analyzed by means of, for instance, the well known affine wavelet transform. The distribution of energy following scale decomposition helps to distinguish the transients (some transients will have more energy on some scales while others may have more energy on other scales). Even after this, however, some transients may be hard to distinguish. Here information regarding the exact shape of the transient may be crucial. To reduce the amount of data without losing essential information, the signal on each scale may be demodulated with a high quality technique such as use of the analytic signal.

Under ideal conditions two transients (the rubbing and electrical interference transients, for example) may be very close in wavelet coefficients but distinguishable. They may take different times to reach full amplitude and to ringdown, and one may have a secondary peak. However when the actual signals are seen under realistic conditions, in which they are arbitrarily positioned with respect to the time sampling function, they may not be distinguishable at all.

Because of the shift variance of the discrete wavelet transform, the actual coefficients may differ substantially from the ideal case.

To show how the system of the present invention corrects this problem, consider the case of a gaussian shaped demodulated signal on one particular scale of the wavelet transform.

Figure 7:
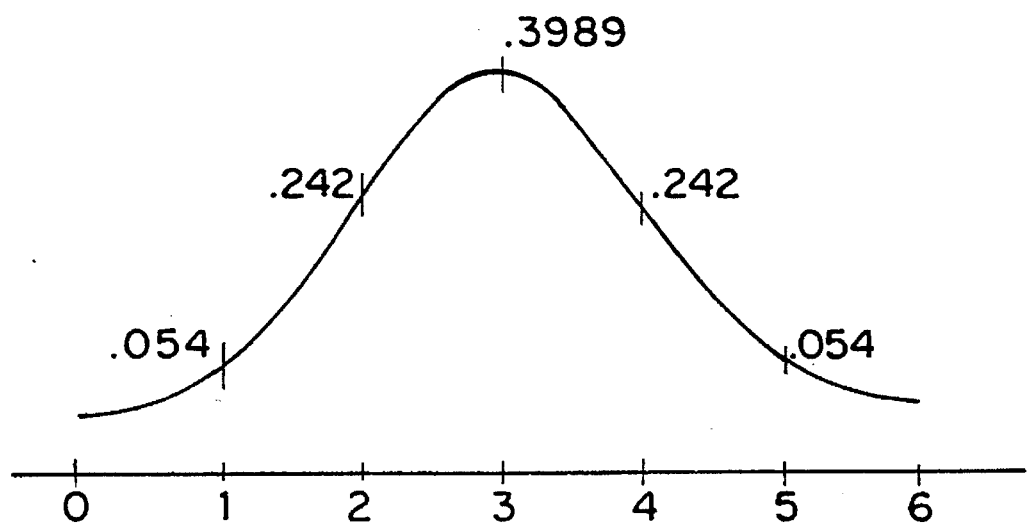
FIGS. 7 and 8 show how the proposed method would work in a Gaussian shaped signal before (FIG. 7) and after (FIG. 8) a shift in sampling.

Referring to FIG. 7, assume it is in the first instance centered on a sample so that one of the samples falls at the mean location. Assume further that other samples fall on the standard deviation locations. (None of these details are important to the basic principles disclosed herein.) If only samples having magnitudes of 0.01 or greater are considered, then the sample values are as indicated in the first row of Table 1, which represents coefficients for gaussian transient, before and after shift.

TABLE 1

| X Abscissa | 1 | 2 | 3 | 4 | 5 | 6 |
|---|---|---|---|---|---|---|
| Y Centered | 0.054 | 0.242 | 0.3989 | 0.242 | 0.054 | |
| Y Offset by 0.5 | 0.0175 | 0.1295 | 0.3521 | 0.3521 | 0.1295 | 0.0175 |

Figure 8:
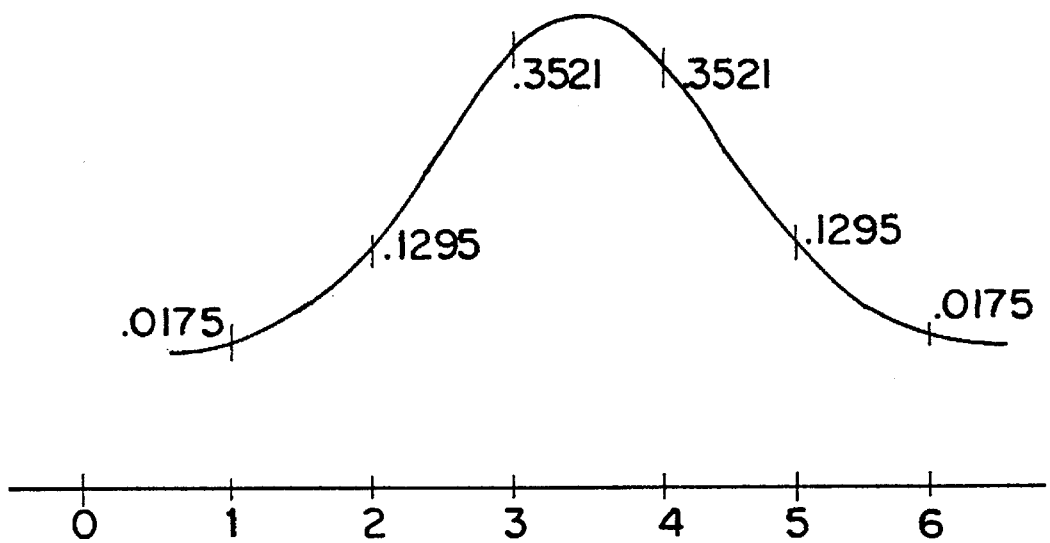

Recall that the coefficients in Table 1 are the coefficients after time-scale analysis including demodulation. It can be seen how both the number of coefficients as well as the coefficients themselves have changed because of a simple half-sample shift. If, however, the centroid is calculated (in this case by dividing the sum of the XY products by the sum of Y), it will indicate that the center of the transient is 3 in the first case ($\Sigma Y=0.9909$, $\Sigma XY=2.9727$, $\Sigma XY/\Sigma Y=3$) and 3.5 in the second case ($\Sigma Y=0.9982$, $\Sigma XY=3.4937$, $\Sigma XY/\Sigma Y=3.5$). Consequently, the results can be stabilized by reanalyzing the data according to the present invention as described above; that is, by shifting the analyzing function by 0.5 for the second case. Since the analyzing function (such as Morlet's wavelet, for example) is expressed analytically as a function of the abscissa, it is usually easy to shift the function by a simple adjustment of the abscissa. When the offset data is reanalyzed, it will have the same coefficients as the centered case and thus will be easily identifiable as belonging to the same class as the centered case. See FIG. 8.

To show that the method of the present invention and as described above works for non-symmetrical transients, a non-symmetrical triangle will be used as another specific example. Consider a triangular shaped transient which rises quickly from zero to 4 by means of the rule: $Y=2X$, $0 \leq X < 2$, but then descends slowly to zero by means of: $Y=6-X$ for $2 < X \leq 6$. See FIG. 9.

Figure 9:
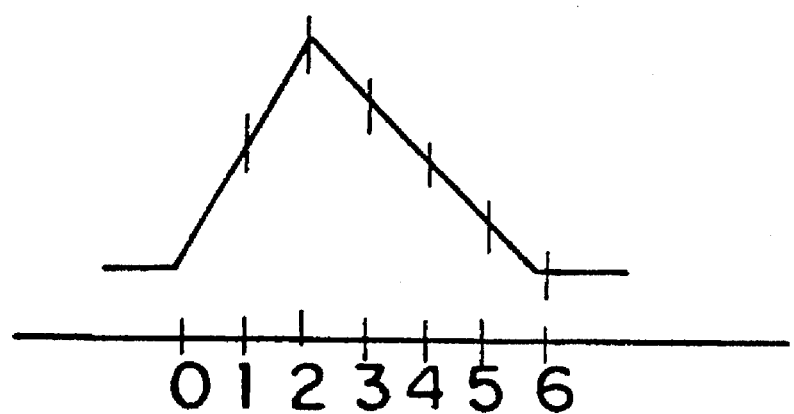
FIGS. 9 and 10 show how the proposed method would work on a non-symmetrical triangular shaped signal before (FIG. 9) and after (FIG. 10) a shift in sampling.
Figure 10:
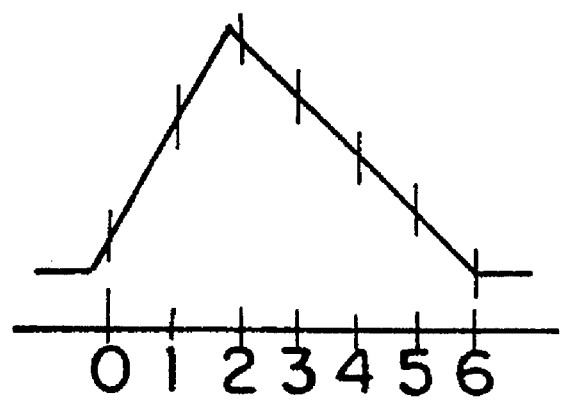

Table 2 tabulates data from FIG. 9. If the transient of FIG. 9 is shifted by, for example, 0.122 units to the left, the Y values at the sample points will be changed, as shown in Table 2 (also see FIG. 10). Yet if the centroid is calculated as described above, it will be found to have shifted by the same amount. For the original signal, ($\Sigma Y=12$, $\Sigma XY=32$, $\Sigma XY/\Sigma Y=2.667$), and in the second case ($\Sigma Y=12$, $XY=30.656$, $XY/\Sigma Y=2.5546$). Again, the instability due to the shift can be corrected by reanalyzing the transient according to the present invention as described above, this time with the analyzing function shifted by the amount determined by the shift in centroid.

Therefore, the system of the present invention provides a simple, effective way of correcting for the shift sensitivity of the discrete signal processing algorithm. In the case of monitoring the rub in the journal bearing in a steam turbine, the present invention provides stable, repeatable coefficients that

TABLE 2

| X Abscissa | 0 | 1 | 2 | 3 | 4 | 5 | 6 |
|---|---|---|---|---|---|---|---|
| Y Original Position | 0 | 2 | 4 | 3 | 2 | 1 | 0 |
| Y Offset by 0.112 sample | 0.224 | 2.224 | 3.888 | 2.888 | 1.888 | 0.888 | 0 | can be compared with previous occurrences of the rubbing, thereby allowing for correct classification so that the transient of interest is not confused with other transients. Thus provides useful and important diagnostic information, and useful and important maintenance information because it allows for trending by determining if the transients are slowly changing in shape or growing in magnitude. The latter may indicate the rubbing is becoming more of a danger in terms of the potential to cause catastrophic failure. If shift correction is not provided for, different samplings of the same transient can give the misleading appearance of a change in magnitude, or worse, can cause confusion with other types of transients.

The present invention may be embodied in other specific forms without departing from the spirit or essential attributes thereof and, accordingly, reference should be made to the appended claims, rather than to the foregoing specification, as indicating the scope of the invention.

I claim:

1. A method of stably identifying and characterizing a transient data pattern contained in an electrical signal representing a physical event, a sampled representation of the electrical signal comprising a first data set having a plurality of sample points, wherein alignment of the sample points with the transient data pattern is arbitrary, the method comprising the steps of:

(a) analyzing the first data set using a predefined mathematical operator, the predefined mathematical operator including preselected parameters, to produce a second data set in which the transient data pattern can be detected and isolated;

(b) detecting and isolating the transient data pattern in the second data set;

(c) determining a location of the detected and isolated transient data pattern in the second data set;

(d) measuring a difference between the location of the detected and isolated transient data pattern and a predetermined location of the predefined mathematical operator at a point of optimal alignment;

(e) adjusting the preselected parameters of the predefined mathematical operator in accordance with the measured location difference such that the adjusted mathematical operator is now aligned with the detected and isolated transient data pattern at the point of optimal alignment;

(f) reanalyzing the first data set using the aligned mathematical operator; and (g) characterizing the detected and isolated transient data pattern to identify the physical event causing the transient data pattern.

2. The method of claim 1, further comprising before step (c), envelope detecting the second data set.

3. The method of claim 1, wherein the step (g) of characterizing the detected and isolated transient data pattern, further comprises the steps of:

(1) comparing at least one predetermined classification model with the detected and isolated transient data pattern;

(2) identifying which of the at least one aligned predetermined classification models most closely resembles the detected and isolated transient data pattern; and (3) classifying the detected and isolated transient data pattern in accordance with the identified predetermined classification model.

4. The method of claim 3 wherein the step (1) of comparing the at least one predetermined classification model comprises the steps of:

(i) selecting one of the predetermined classification models;

(ii) determining a location of the selected model;

(iii) measuring a difference between the location of the detected and isolated transient data pattern and the location of the selected model at a point of optimal alignment; and (iv) adjusting the location of the selected model in accordance with the measured location difference such that the adjusted selected model is now aligned with the detected and isolated transient data pattern at the point of optimal alignment.

5. The method of claim 4 further comprising before step (ii), the step of envelope detecting the selected predetermined classification model.

6. The method of claim 1, wherein the predefined mathematical operator comprises a multiscale transform.

7. The method of claim 1 wherein the predefined mathematical operator comprises a wavelet transform.

8. The method of claim 1 further comprising a preliminary step of:

sensing physical parameters of the physical event to provide the electrical signal.

9. The method of claim 8 further comprising the step of:

converting the electrical signal representing the sensed physical parameters to a digital signal representing the first data set.

10. The method of claim 4 wherein the selected classification model comprises a wavelet transform.

11. The method of claim 4 further comprising repeating steps (i)–(iv) for each of the other predetermined classification models.

12. A system for analyzing isolated data patterns in a signal comprising:

sensor means for sensing and receiving an analog input signal representing a first data pattern;

signal conditioning means for conditioning the analog input signal;

analog-to-digital converter means for converting the analog input signal to a first digital signal representing the first data pattern;

first analyzing means for analyzing the first digital signal using a predetermined mathematical operator to produce a second digital signal representing a second data pattern;

detecting means for analyzing the second digital signal to detect a discrete data pattern in the second data pattern;

isolating means for isolating the discrete data pattern in the second data pattern by estimating a boundary of the discrete data pattern;

location determining means for determining a location of the isolated discrete data pattern;

measuring means for measuring a difference between the location of the isolated discrete data pattern and a predetermined location of the mathematical operator;

adjusting means for adjusting preselected parameters of the mathematical operator in accordance with the measured location difference such that the adjusted mathematical operator is aligned with the isolated discrete data pattern; and second analyzing means for analyzing the first digital signal using the aligned mathematical operator.

13. The system of claim 12 wherein the first analyzing means analyzes the first digital signal using a convolution.

14. The system of claim 12 wherein the first analyzing means analyzes the first digital signal using a correlation.

15. The system of claim 12 wherein the discrete data pattern comprises an unmodulated transient in the second data pattern.

16. The system of claim 12 wherein the discrete data pattern comprises a modulated transient in the second data pattern.

17. The system of claim 16 wherein the detecting means calculates an envelope of the modulated transient in the second data pattern.

18. The system of claim 12 wherein the detecting means detects both modulated and unmodulated transients in the second data pattern.

19. The system of claim 12 further comprising
testing means for testing the isolated discrete data pattern to determine if the isolated discrete data pattern is modulated.

20. The system of claim 19 wherein the testing means tests the isolated discrete data pattern using an auto-regression moving average.

21. The system of claim 19 wherein the testing means tests the isolated discrete data pattern using a fast Fourier transform.

22. The system of claim 12 wherein the detecting means compares an absolute value of signal samples of the second digital signal to a predetermined threshold value.

23. The system of claim 12 wherein the detecting means compares a squared value of signal samples of the second digital signal to a predetermined threshold value.

24. The system of claim 12 wherein the detecting means requires at least several adjacent signal samples exceed a predetermined threshold before detecting the discrete data pattern.

25. The system of claim 12 wherein the detecting means ignores occasional values of a signal sample which are below a predetermined threshold value.

26. The system of claim 12 further comprising filtering means for filtering demodulated transients from the second digital signal, wherein said filtering means filters the second digital signal at a predetermined interval time.

27. The system of claim 12 wherein the predetermined mathematical operator comprises a wavelet transform.

28. A system for analyzing isolated data patterns in a signal comprising:

a sensor for sensing and receiving an analog input signal representing a first data pattern;

a signal conditioner for conditioning the analog input signal;

an analog-to-digital converter for converting the analog input signal to a first digital signal representing the first data pattern;

a first analyzer for analyzing the first digital signal using a predetermined mathematical operator to produce a second digital signal representing a second data pattern;

a detector for analyzing the second digital signal to detect a discrete data pattern in the second data pattern;

an isolator for isolating the discrete data pattern in the second data pattern by estimating a boundary of the discrete data pattern;

a location determiner for determining a location of the isolated discrete data pattern;

a first circuit for measuring a difference between the location of the isolated discrete data pattern and a predetermined location of the mathematical operator;

a second circuit for adjusting preselected parameters of the mathematical operator in accordance with the measured location difference such that the adjusted mathematical operator is aligned with the isolated discrete data pattern; and a second analyzer for analyzing the first digital signal using the aligned mathematical operator.

* * * * *